United States Patent
Boskovic

(10) Patent No.: US 7,890,837 B2
(45) Date of Patent: Feb. 15, 2011

(54) SYSTEM AND METHOD FOR A COMMON TESTING FRAMEWORK

(75) Inventor: Srdjan Boskovic, Walldorf (DE)

(73) Assignee: SAP AG, Walldorf (DE)

( * ) Notice: Subject to any disclaimer, the term of this patent is extended or adjusted under 35 U.S.C. 154(b) by 1090 days.

(21) Appl. No.: 11/644,486

(22) Filed: Dec. 21, 2006

(65) Prior Publication Data

US 2008/0155367 A1 Jun. 26, 2008

(51) Int. Cl.
*H03M 13/00* (2006.01)

(52) U.S. Cl. .................. 714/758; 714/703; 714/720

(58) Field of Classification Search ............... 714/758, 714/703, 715, 720, 49, 48, 33, 25, 37, 6
See application file for complete search history.

(56) References Cited

U.S. PATENT DOCUMENTS

| 7,506,311 B2 * | 3/2009 | Subramanian et al. ...... 717/124 |
| 2005/0097515 A1 * | 5/2005 | Ribling ...................... 717/124 |

* cited by examiner

*Primary Examiner*—Fritz Alphonse
(74) *Attorney, Agent, or Firm*—Schwegman, Lundberg & Woessner, P.A.

(57) ABSTRACT

In an embodiment, a method provides an input and an expected test output for a unit test. The unit test is executed using a module under test and the input, thereby generating an actual test output. The actual and expected test outputs are serialized into XML, so that comparison and extraction of differences between actual and expected test outputs can be performed using methods for comparisons and extraction of differences between XML documents, such as XML change detection or calculation of checksums.

18 Claims, 4 Drawing Sheets

SYSTEM AND METHOD FOR A COMMON TESTING FRAMEWORK

TECHNICAL FIELD

Various examples relate to the field of testing of processor-based systems, and in an example, but not by way of limitation, to a system and method for a common framework for testing such systems.

BACKGROUND

System analysis of computer and other processor-based systems is an involved and painstaking process. Such system analyses may include system testing, unit and/or module testing, and performance analysis, just to name a few.

Whatever the analysis, test data is normally required for that analysis. The creation and maintenance of such test data and the expected output generated by that test data is not a trivial task. This is particularly true when a system comprises a multitude of modules or units, and some modules require a different format for their input data and produce their output data in a different format. This is further complicated when one is dealing with multiple systems, such as a production (or customer) system and a test (or reference) system. Such test data is normally manually prepared, which takes a great deal of effort, and as such, is susceptible to errors. The art is therefore in need of an alternative method of analyzing and/or testing processor-based systems.

SUMMARY

In an embodiment, a method provides an input and an expected test output for a unit test. The unit test is executed using a module under test and the input, thereby generating an actual test output. The actual and expected test outputs are serialized into XML, so that comparison and extraction of differences between actual and expected test outputs can be performed using methods for comparisons and extraction of differences between XML documents, such as XML change detection or calculation of checksums.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limiting sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
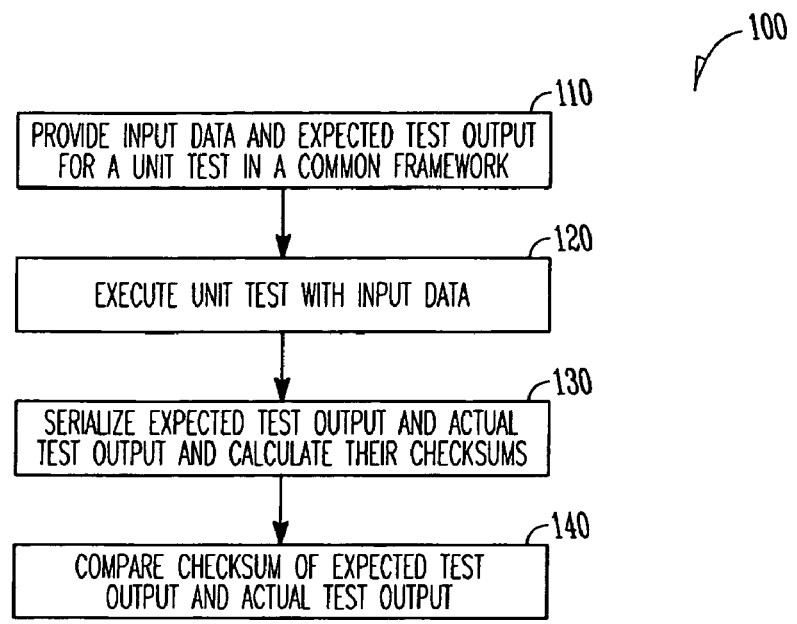
FIG. 1 illustrates a flowchart of an example embodiment of a process for a unit test in a common testing framework.

FIG. 1. illustrates an example embodiment of a process 100 to conduct testing of a processor-based system within a common framework. As shown in FIG. 1, at operation 110, an input and an expected test output for a unit test are provided to a common framework. The term common framework is used because all the data, i.e., input data, expected output data, and actual output data are converted into a common format within the common framework. As is discussed below, in one embodiment, the common format is XML. At 120, the unit test is executed by supplying the input data to a module under test. The processing of the input data by the module under test generates an actual test output. At 130, the expected test output and the actual test output are serialized into an XML format, and their checksums are calculated. At 140, the checksum of the expected test output and the actual test output are compared. The serialization of the data converts any and all data formats into an XML format, thereby making the calculation of the checksums an easier task. If the checksums are not equal, then the expected test output and the actual test output are not equal. The details of the differences between the expected test output and the actual test output can be determined by examining the serialized data with an XML analysis tool such as an XML parser and/or an XML change detection algorithm.

Figure 2:
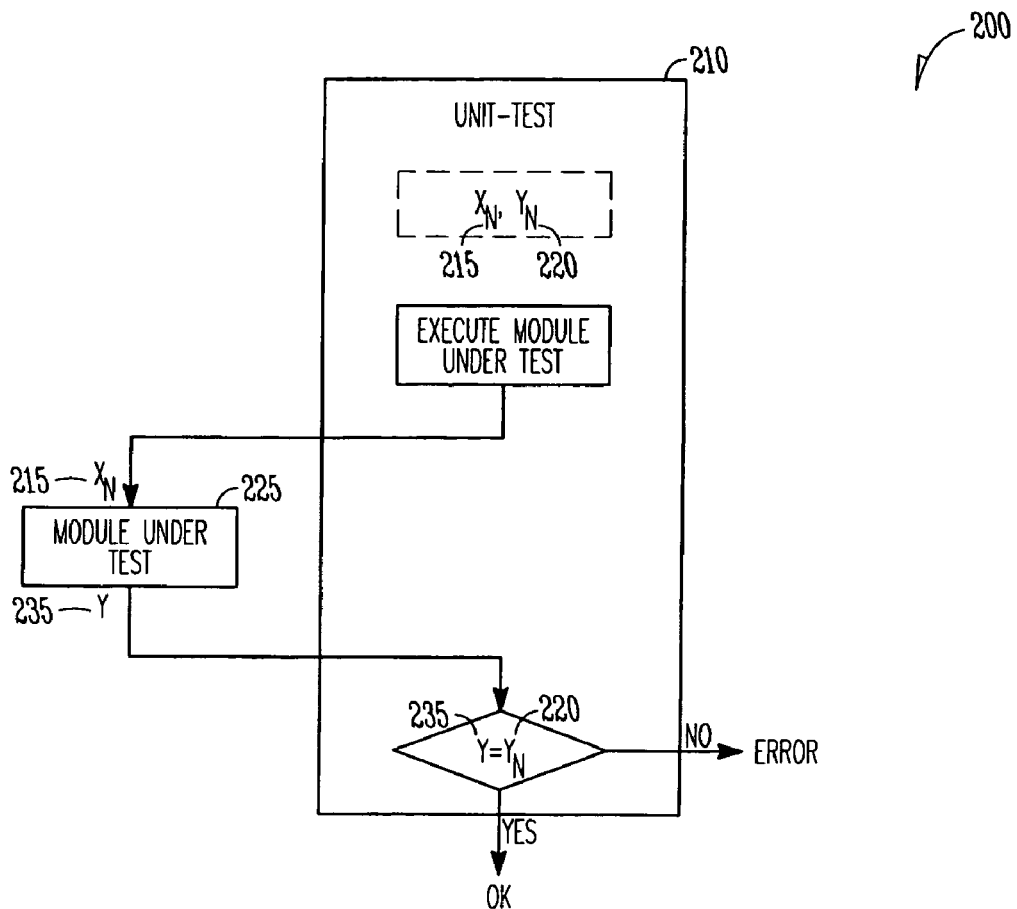
FIG. 2 illustrates a block diagram of an example embodiment of a common testing framework.

FIG. 2 illustrates the process of FIG. 1 in graphical form. FIG. 2 illustrates a unit test 200 that includes a common unit test framework 210. The unit test framework includes an input 215 ($X_n$) and an expected output ($Y_n$) 220. The input 215 is supplied to the module under test 225. After the execution of the module under test, the actual output (Y) 235 is compared to the expected output 220. If they are equal, then the module under test is not in error. If they are not, there is an error. As disclosed above, in one embodiment, the expected test output 220 and the actual test output 235 may be serialized, a checksum may be calculated for the expected test output 220 and the actual test output 235, and the checksums may be compared. If the checksums are not equal, the expected test output 220 and the actual test output 235 are not equal, and the problem can be investigated further by analyzing the serialized data.

Figure 3:
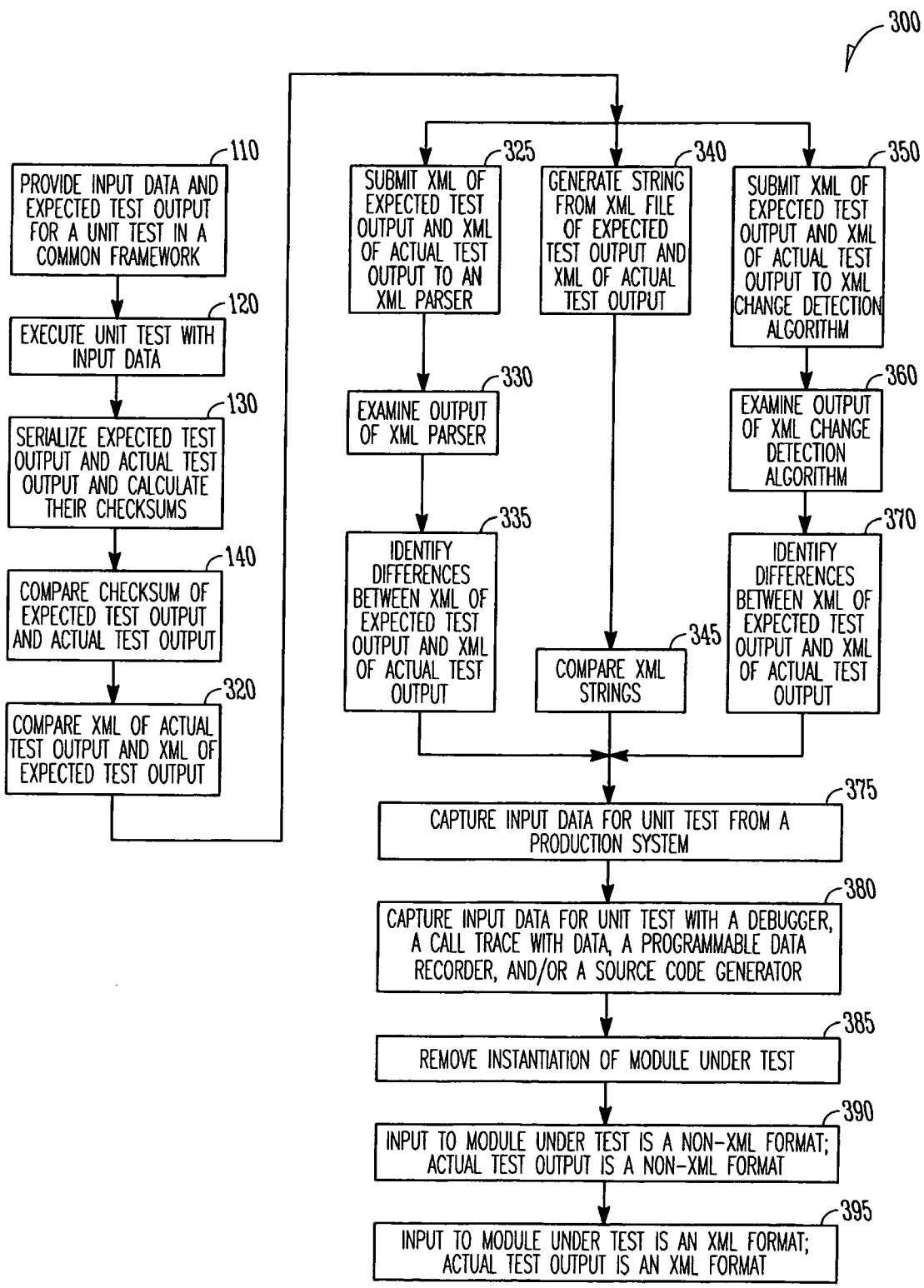
FIG. 3 illustrates a flowchart of another example embodiment of a process for a unit test in a common testing framework.

FIG. 3 illustrates another embodiment of a process 300 to conduct testing and other analyses of a processor-based system within a common framework. FIG. 3 includes operations 110, 120, 130, and 140 of process 100 of FIG. 1. The process 300 of FIG. 3 further includes at operation 320, a comparison of the XML of the actual test output and the XML of the expected test output. In an embodiment, this comparison is only performed when the checksum of the actual test output and the checksum of the expected test output are not equal.

At operations 325, 330, and 335, the comparison of the XML of the actual test output and the XML of the expected test output at operation 320 involves an XML parser. Specifically, at operation 325, the XML of the actual test output and the XML of the expected test output are analyzed using an XML parser. At operation 330, the outputs of the XML parser are examined to determine if the XML of the actual test output and the XML of the expected test output are equal. At operation 335, any differences between the XML of the actual test output and the XML of the expected test output are identified. In another embodiment, at operation 340, the XML parser generates a string from the XML file containing the actual test output and a string from the XML file containing the expected test output, and at operation 345, the strings are compared to determine if the actual test output is equal to the expected test output.

In a similar fashion, at operations 350, 360, and 370, the comparison of the XML of the actual test output and the XML of the expected test output at operation 320 involves the invocation of an XML change detection algorithm. Specifically, at operation 350, the XML of the actual test output and the XML of the expected test output are submitted to an XML change detection algorithm. Any change detection algorithm could be used including, but not limited to, XML-diff, LaDiff, MH-Diff, XML TreeDiff, MMDiff, XMDiff, and XyDiff, just to list a few examples. At operation 360, the output of the XML change detection algorithm is examined to determine if the XML of the actual test output and the XML of the expected output are equal. At 370, any differences between the XML of the actual test output and the XML of the expected test output are identified.

At operation 375, the input for the unit test is captured from a production system that includes a production version of the module under test in the unit test. This production data may be used as the input data at 110. Also, the data to be used as input at 110 may be manually created, or it may be captured in the same system on which the unit test is performed. At operation 380, the capturing of the input for the unit test includes the use of one or more of a debugger, a call trace with data, a programmable data recorder, and a source code generator, all of which are well known to those of skill in the art. At operation 385, an instantiation of the module under test is removed after the calculation of the checksums, the execution of the XML parsing, and/or the execution of the XML change detection algorithm. At operation 390, the input to the module under test comprises a non-XML format, and the actual test output comprises a non-XML format. At operation 395, the input to the module under test comprises an XML format, and the actual test output comprises an XML format.

Figure 4:
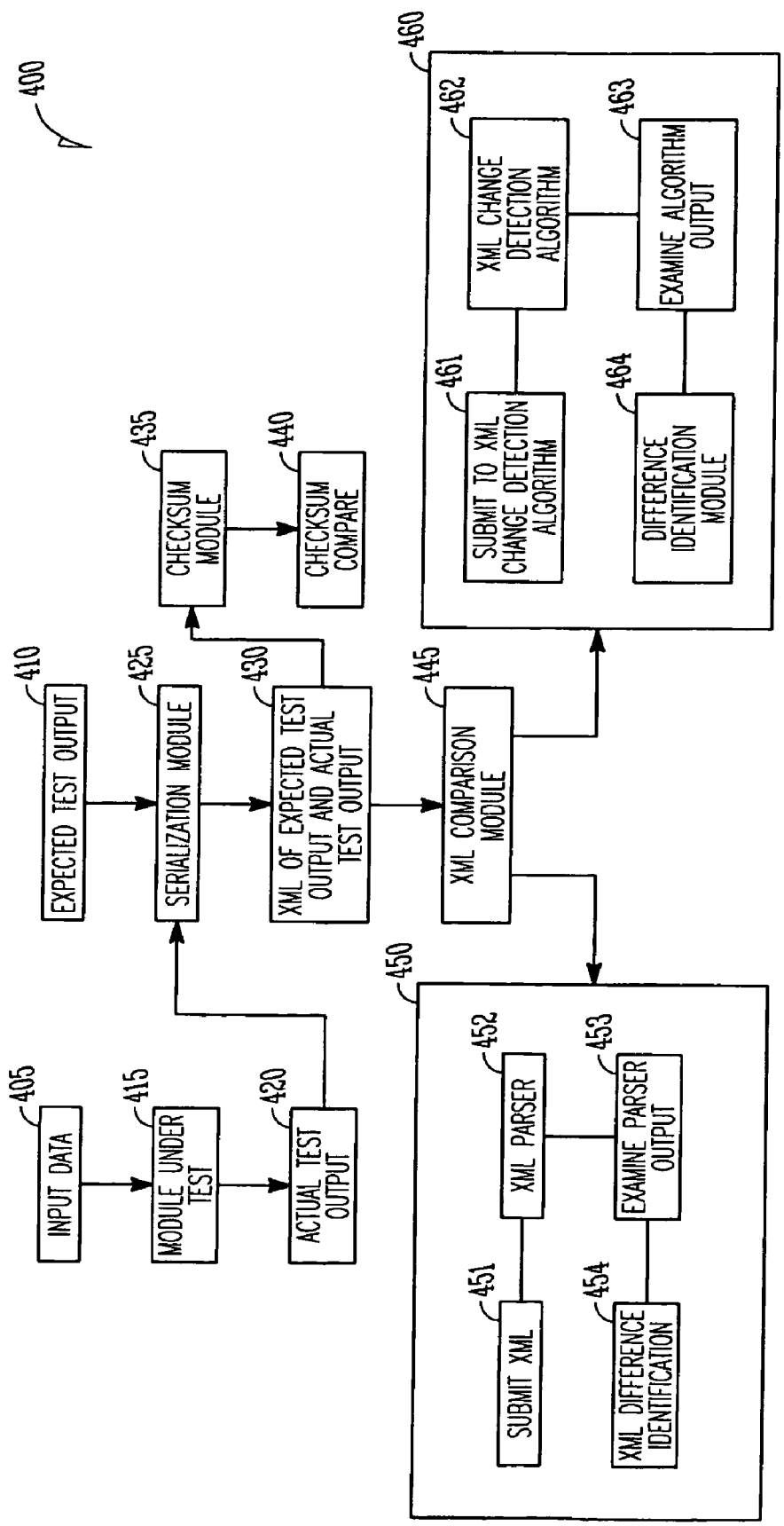
FIG. 4 illustrates another block diagram of an example embodiment of a common testing framework.

FIG. 4 illustrates an embodiment of a system 400 for a common framework for the unit testing, modular testing, or other testing or analysis of a processor-based system. Within the system 400, there is an input 405 and an expected test output 410 for a unit test. A module 415 executes the unit test using a module under test and the input 405. This generates an actual test output 420. A module 425 serializes the actual test output and the expected test output into an XML format 430. A module 435 calculates a checksum of the XML of the actual test output and the XML of the expected test output, and a module 440 compares the checksum of the actual test output and the expected test output.

The system 400 in another embodiment may further include a module 445 to compare the XML of the actual test output and the XML of the expected test output when the checksum of the actual test output and the checksum of the expected test output are not equal. The module 445 for comparing the XML of the actual test output and the XML of the expected test output in one embodiment may include a module 450 to process the XML of the actual test output and the XML of the expected test output. The module 450 may include a module 451 to submit the XML of the actual test output and the XML of the expected test output to an XML parser 452. This particular embodiment may further include a module 453 to examine the output of the XML parser 452 to determine if the XML of the actual test output and the XML of the expected test output are equal. A module 454 identifies any differences between the XML of the actual test output and the XML of the expected test output.

Similarly, another embodiment may include a module 460 for comparing the XML of the actual test output and the XML of the expected test output when the checksum of the actual test output and the checksum of the expected test output are not equal. The module 460 may include a module 461 for submitting the XML of the actual test output and the XML of the expected test output to an XML change detection algorithm 462. A module 463 examines the output of the XML change detection algorithm to determine if the XML of the actual test output and the XML of the expected output are equal. A module 464 identifies any differences between the XML of the actual test output and the XML of the expected test output.

In the system 400 of FIG. 4, the input for the unit test may be captured from a production system that includes a production version of the module under test in the unit test. Also, the input for the unit test may be captured from the same system, such as a development system, upon which the unit test is being performed. Additionally, the capturing of the input for the unit test may include the use of one or more of a debugger, a call trace with data, a programmable data recorder, and a source code generator.

The system 400 may further include a machine readable medium that includes instructions, that when executed on a machine, execute the process 100 of FIG. 1, the process 300 of FIG. 3, or some other similar process to perform a test, unit test, or other analysis of a processor-based system in a common framework. As an example, the machine readable medium may include instructions that cause the system to receive an input and an expected test output for a unit test, execute the unit test using a module under test and the input (thereby generating an actual test output), calculate a checksum of the actual test output and the expected test output, and compare the checksum of the actual test output and the expected test output. The machine readable medium may further include instructions to serialize the actual test output and the expected test output into an XML format, and parse the XML output and/or submit the XML output to an XML difference algorithm.

An embodiment of a machine readable medium may further include instructions for comparing the XML of the actual test output and the XML of the expected test output. These instructions may include submitting the XML of the actual test output and the XML of the expected test output to an XML parser, examining the outputs of the XML parser to determine if the XML of the actual test output and the XML of the expected test output are equal, and identifying any differences between the XML of the actual test output and the XML of the expected test output. Similarly, the instructions for comparing the XML of the actual test output and the XML of the expected test output may include submitting the XML of the actual test output and the XML of the expected test output to an XML change detection algorithm, examining the output of the XML change detection algorithm to determine if the XML of the actual test output and the XML of the expected output are equal, and identifying any differences between the XML of the actual test output and the XML of the expected test output. In another embodiment, the machine readable medium may be configured with instructions such that the input for the unit test is captured from a production system that includes a production version of the module under test in the unit test, and further configured with instructions such that the capturing of the input for the unit test includes the use of one or more of a debugger, a call trace with data, a programmable data recorder, and a source code generator. As previously disclosed, the data could also be captured from the same system.

Figure 5:
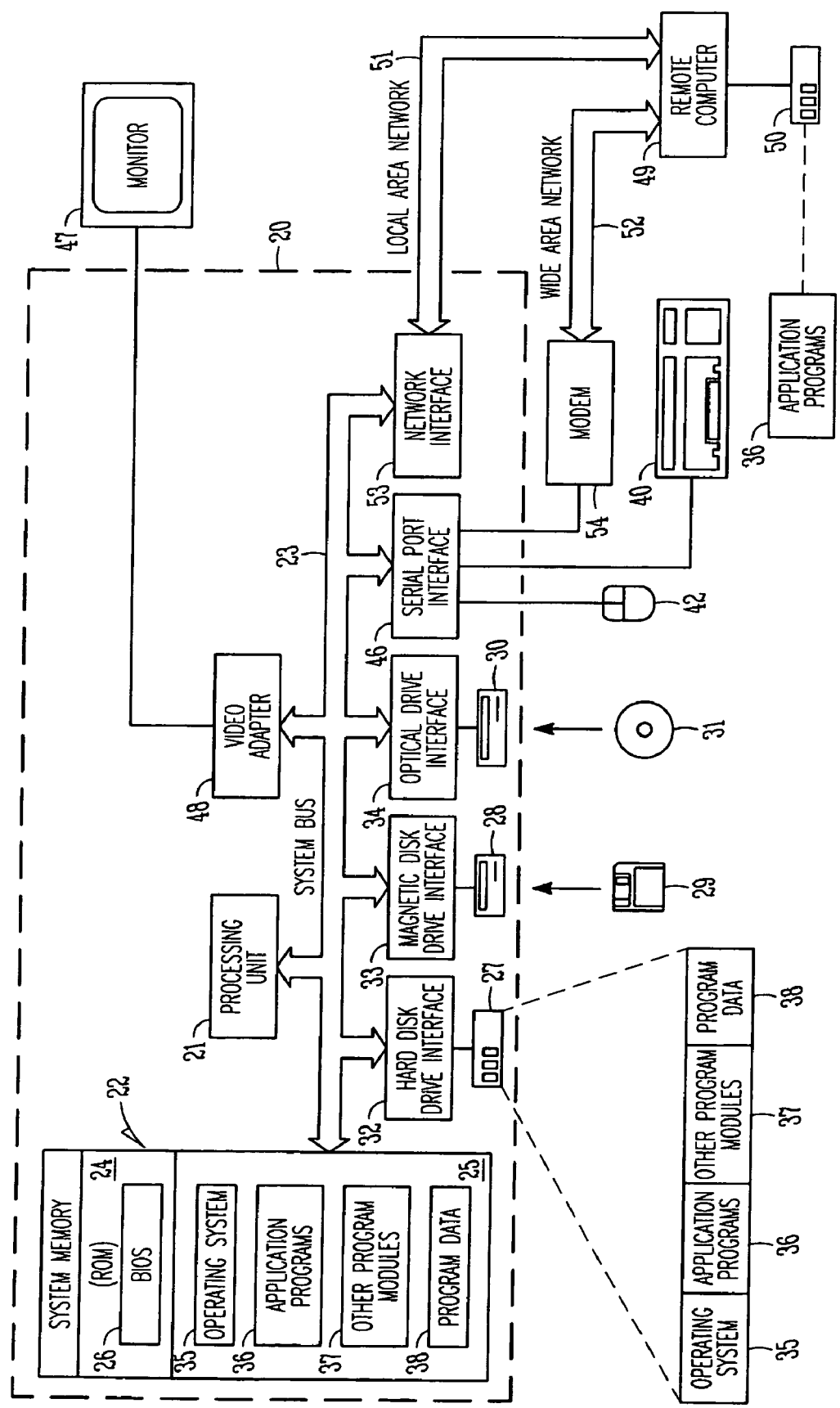
FIG. 5 illustrates an example embodiment of a processor-based system upon which, and in connection with which, one or more examples of the present disclosure may operate.

FIG. 5 is an overview diagram of a hardware and operating environment in conjunction with which embodiments of the disclosure may be practiced. The description of FIG. 5 is intended to provide a brief, general description of suitable computer hardware and a suitable computing environment in conjunction with which the disclosure may be implemented. In some embodiments, the examples of the disclosure are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the examples of the disclosure may be practiced with other computer system configurations, including hand-held devices, multiprocessor systems, microprocessor-based or programmable consumer electronics, network PCS, minicomputers, mainframe computers, and the like. The examples of the disclosure may also be practiced in distributed computer environments where tasks are performed by I/0 remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the examples in the disclosure are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the Internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description, various features are grouped together in one or more examples or examples for the purpose of streamlining the disclosure. This method of disclosure is not to be interpreted as reflecting an intention that the claimed examples of the invention require more features than are expressly recited in each claim. Rather, as the following claims reflect, inventive subject matter lies in less than all features of a single disclosed example. Thus the following claims are hereby incorporated into the detailed description of examples of the invention, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
   providing in a computer processor an input and an expected test output for a unit test;
   executing in the computer processor the unit test using a module under test and the input, thereby generating an actual test output;
   serializing the expected test output and the actual test output into an Extensible Markup Language(XML) format;
   comparing with the computer processor the XML expected test output and the XML actual test output; and
   comparing with the computer processor the XML actual test output and the XML expected test output when the checksum of the actual test output and the checksum of the expected test output are not equal;
   wherein the comparing of the XML of the actual test output and the XML of the expected test output comprises:
      submitting the XML actual test output to an XML parser;
      submitting the XML expected test output to the XML parser;
      examining the outputs of the XML parser to determine if the XML of the actual test output and the XML of the expected test output are equal; and
      identifying any differences between the XML of the actual test output and the XML of the expected test output.

2. The method of claim 1, further comprising:
   calculating with the computer processor a checksum of the serialized actual test output and the serialized expected test output; and
   comparing with the computer processor the checksum of the actual test output and the checksum of the expected test output.

3. The method of claim 1, wherein the XML parser generates a string from the XML file containing the actual test output and a string from the XML file containing the expected test output, and further comprising comparing the strings to determine if the actual test output is equal to the expected test output.

4. The method of claim 1, wherein the comparing of the XML of the actual test output and the XML of the expected test output comprises:
   submitting to the computer processor the XML of the actual test output and the XML of the expected test output to an XML change detection algorithm;
   examining with the computer processor the output of the XML change detection algorithm to determine if the XML of the actual test output and the XML of the expected output are equal; and
   identifying with the computer processor any differences between the XML of the actual test output and the XML of the expected test output.

5. The method of claim 1, wherein the input for the unit test is captured from a production system that includes a production version of the module under test in the unit test.

6. The method of claim 1, wherein the input for the unit test is captured from the system upon which the unit test is being performed.

7. The method of claim 5 or 6, wherein the capturing of the input for the unit test includes the use of one or more of a debugger, a call trace with data, a programmable data recorder, and a source code generator.

8. The method of claim 1, further comprising removing with the computer processor an instantiation of the module under test after the calculation of the checksum of the actual test output and the checksum of the expected test output when the checksum of the actual test output and the checksum of the expected test output are equal.

9. A system comprising:
   an input and an expected test output for a unit test;
   a computer processor configured for executing the unit test using a module under test and the input, thereby generating an actual test output;
   a computer processor configured for serializing the expected test output and the actual test output into an Extensible Markup Language(XML) format; and
   a computer processor configured module for comparing the XML expected test output and the XML actual test output; and
   a computer processor configured for comparing the XML of the actual test output and the XML of the expected test output when the checksum of the actual test output and the checksum of the expected test output are not equal;
   wherein the computer processor configured for comparing the XML of the actual test output and the XML of the expected test output comprises:
      a computer processor configured for submitting the XML of the actual test output to an XML parser;
      a computer processor configured for submitting the XML of the expected test output to the XML parser;

a computer processor configured for examining the outputs of the XML parser to determine if the XML of the actual test output and the XML of the expected test output are equal; and a computer processor configured for identifying any differences between the XML of the actual test output and the XML of the expected test output.

10. The system of claim 9, further comprising:

a computer processor configured for calculating a checksum of the actual test output and a checksum of the expected test output; and a computer processor configured for comparing the checksum of the actual test output and the checksum of the expected test output.

11. The system of claim 9, wherein the computer processor configured for comparing the XML of the actual test output and the XML of the expected test output comprises:

a computer processor configured for submitting the XML of the actual test output and the XML of the expected test output to an XML change detection algorithm;

a computer processor configured for examining the output of the XML change detection algorithm to determine if the XML of the actual test output and the XML of the expected output are equal; and a computer processor configured for identifying any differences between the XML of the actual test output and the XML of the expected test output.

12. The system of claim 9, wherein the input for the unit test is captured from a production system that includes a production version of the module under test in the unit test; and further wherein the capturing of the input for the unit test includes the use of one or more of a debugger, a call trace with data, a programmable data recorder, and a source code generator.

13. The system of claim 9, wherein the input for the unit test is captured from the system upon which the unit test is being executed, and further wherein the capturing of the input for the unit test includes the use of one or more of a debugger, a call trace with data, a programmable data recorder, and a source code generator.

14. A tangible machine readable storage medium including instructions that when executed on a machine execute a process comprising:

receiving an input and an expected test output for a unit test;

executing the unit test using a module under test and the input, thereby generating an actual test output;

serializing the expected test output and the actual test output into an Extensible Markup Language (XML) format;

comparing the XML expected test output and the XML actual test output; and comparing the XML of the actual test output and the XML of the expected test output when the checksum of the actual test output and the checksum of the expected test output are not equal;

wherein the instructions for comparing the XML of the actual test output and the XML of the expected test output comprise:

submitting the XML of the actual test output to an XML parser;

submitting the XML of the expected test output to the XML parser;

examining the outputs of the XML parser to determine if the XML of the actual test output and the XML of the expected test output are equal; and identifying any differences between the XML of the actual test output and the XML of the expected test output.

15. The machine readable medium of claim 14, further comprising instructions for:

calculating a checksum of the actual test output and a checksum for the expected test output; and comparing the checksum of the actual test output and the checksum of the expected test output.

16. The machine readable medium of claim 14, wherein the instructions for comparing the XML of the actual test output and the XML of the expected test output comprise:

submitting the XML of the actual test output and the XML of the expected test output to an XML change detection algorithm;

examining the output of the XML change detection algorithm to determine if the XML of the actual test output and the XML of the expected output are equal; and identifying any differences between the XML of the actual test output and the XML of the expected test output.

17. The machine readable medium of claim 14, wherein the input for the unit test is captured from a production system that includes a production version of the module under test in the unit test; and further wherein the capturing of the input for the unit test includes the use of one or more of a debugger, a call trace with data, a programmable data recorder, and a source code generator.

18. The machine readable medium of claim 14, wherein the input for the unit test is captured from the same system upon which the unit test is performed; and further wherein the capturing of the input for the unit test includes the use of one or more of a debugger, a call trace with data, a programmable data recorder, and a source code generator.

* * * * *